Oct. 9, 1945. H. J. LYNCH 2,386,697
INJECTION MOLDING OF PLASTIC MATERIALS
Filed Aug. 13, 1942 7 Sheets-Sheet 3

Fig. 3.

INVENTOR
Harold J. Lynch
BY
Pennie, Davis, Marvin & Edmonds
ATTORNEYS

Oct. 9, 1945. H. J. LYNCH 2,386,697
INJECTION MOLDING OF PLASTIC MATERIALS
Filed Aug. 13, 1942 7 Sheets-Sheet 4

INVENTOR
*Harold J. Lynch*
BY
*Pennie, Davis, Marvin & Edmonds*
ATTORNEYS

Oct. 9, 1945.   H. J. LYNCH   2,386,697
INJECTION MOLDING OF PLASTIC MATERIALS
Filed Aug. 13, 1942   7 Sheets-Sheet 6

INVENTOR
Harold J. Lynch
BY
Pennie, Davis, Marvin & Edmonds
ATTORNEYS

Oct. 9, 1945.  H. J. LYNCH  2,386,697
INJECTION MOLDING OF PLASTIC MATERIALS
Filed Aug. 13, 1942   7 Sheets-Sheet 7

INVENTOR
Harold J. Lynch
BY
Pennie, Davis, Marvin & Edmonds
ATTORNEYS

Patented Oct. 9, 1945

2,386,697

UNITED STATES PATENT OFFICE 2,386,697

INJECTION MOLDING OF PLASTIC MATERIALS

Harold J. Lynch, Cornwall-on-Hudson, N. Y.

Application August 13, 1942, Serial No. 454,649

19 Claims. (Cl. 18—30)

This invention relates to injection molding of plastic materials and particularly to improvements permitting the molding of beads and similar bodies of plastic material on continuous lengths of chain or other flexible support to afford a variety or articulated objects of aesthetic and utilitarian value.

While the invention was developed primarily to afford a commercially practicable and economical means for the manufacture of an article of religious use generally referred to as a "rosary," in which the beads are arranged in a definite manner prescribed by custom, the apparatus as hereinafter described is not limited to that particular use. By substitution of proper molds, beads or similar bodies of any size or conformation and in any desired arrangement may be molded on a chain or, if desired, on any flexible element. The chain carrying beads or similar bodies molded thereon in accordance with the invention may be cut to desired lengths and utilized for any purpose for which it may be adapted.

Rosaries have been manufactured in and imported from Europe for many years. They were produced largely by manual labor. The beads, formed separately of any suitable material, were strung on wire. The ends of the wire were bent to form links and connected to intermediate links to form a chain. Such labor is entirely too costly in this country to permit competition, and even when the European source is completely cut off, chains manufactured by manual methods are too expensive for distribution to the average user in this country.

It is the object of the present invention to afford a method and apparatus for molding beads and similar bodies on continuous lengths of chain or other flexible support.

Another object of the invention is the provision of means permitting repetition of the molding operation as the chain or other flexible support is advanced and the removal of the waste material from the molded bodies to afford a finished product.

A further object of the invention is the provision of means which assures the uniform positioning of the chain as each section is advanced to the molding stage, without distorting or crushing the chain.

Other objects and advantages of the invention will be apparent as it is better understood by reference to the following specification and the accompanying drawings, illustrating a preferred embodiment of the invention, in which.

The formation of molded bodies by injection molding is well known, and machines are available for that purpose. Such a machine is employed in connection with the present invention, but forms no part thereof. The apparatus hereinafter described is adapted to be attached to and to be utilized in connection with any standard injection molding machine, for example the machine manufactured and sold by Reed-Prentice Corporation, of Worcester, Mass., and currently identified as 10-A and 10-D. That machine affords the necessary mechanism for feeding and plasticizing the plastic material and for forcing or injecting it at required intervals into the mold where the desired product is formed. Suitable mechainsm is provided in such a machine for closing and opening the molds at intervals, the plastic material being introduced while the mold is closed and the molded object being removed when the mold is opened. The formation of molded bodies on a chain formed of angularly-disposed, loosely-connected links presents new problems for which no solution is provided in standard injection molding machines. The chain is usually quite fragile and is readily distorted. Necessarily if a product of uniform character is to be produced, the chain must be fed to the mold with the successive links thereof in a predetermined position relative thereto and must be held rigidly during the molding operation. If the chain twists or fails in the slightest degree to take the required position, the product will be quite worthless. To permit continuous operation, the chain must be advanced after each molding operation or "shot." It is also necessary to remove the surplus material after the molding operation without injury to the product. The mechanism as described herein performs all of the required functions and permits the continuous production of beads and similar bodies on continuous lengths of chain or, if desired, on other flexible elements.

Figure 1:
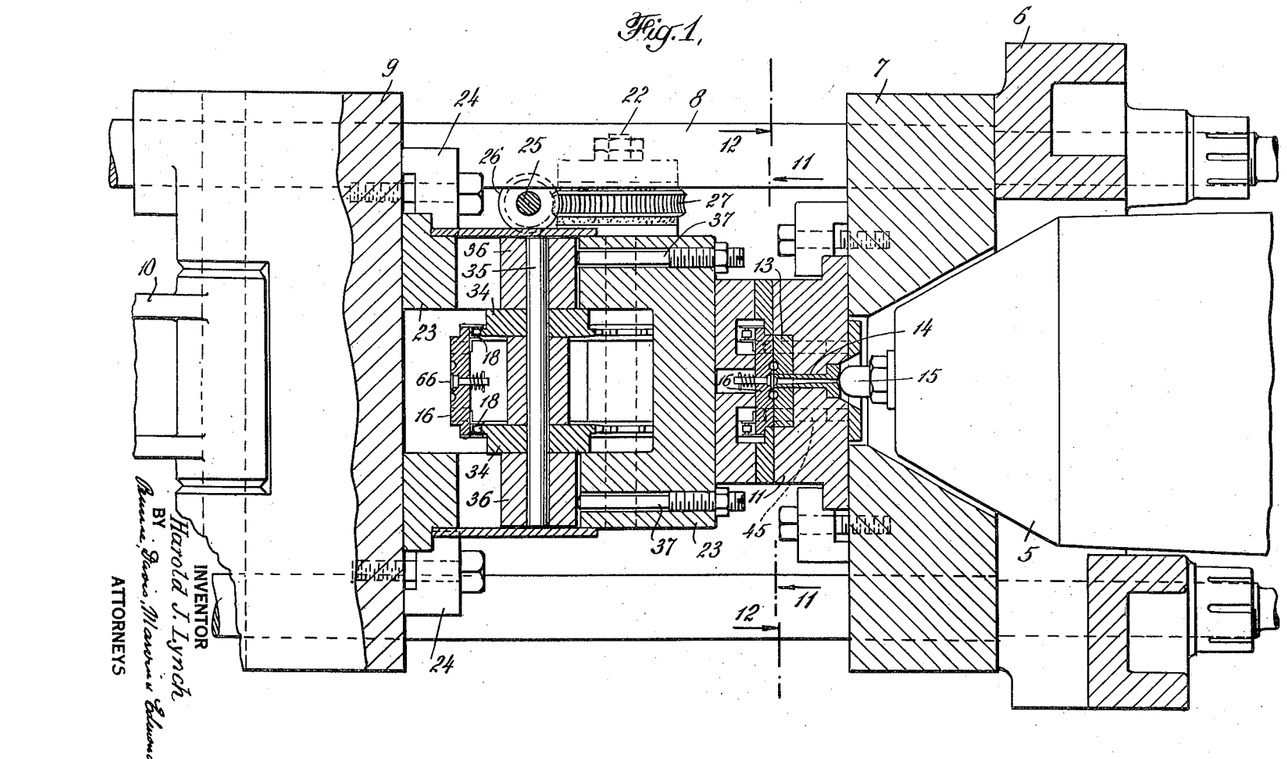
Fig. 1 is a section on the line 1—1 of Fig. 2.
Figure 2:
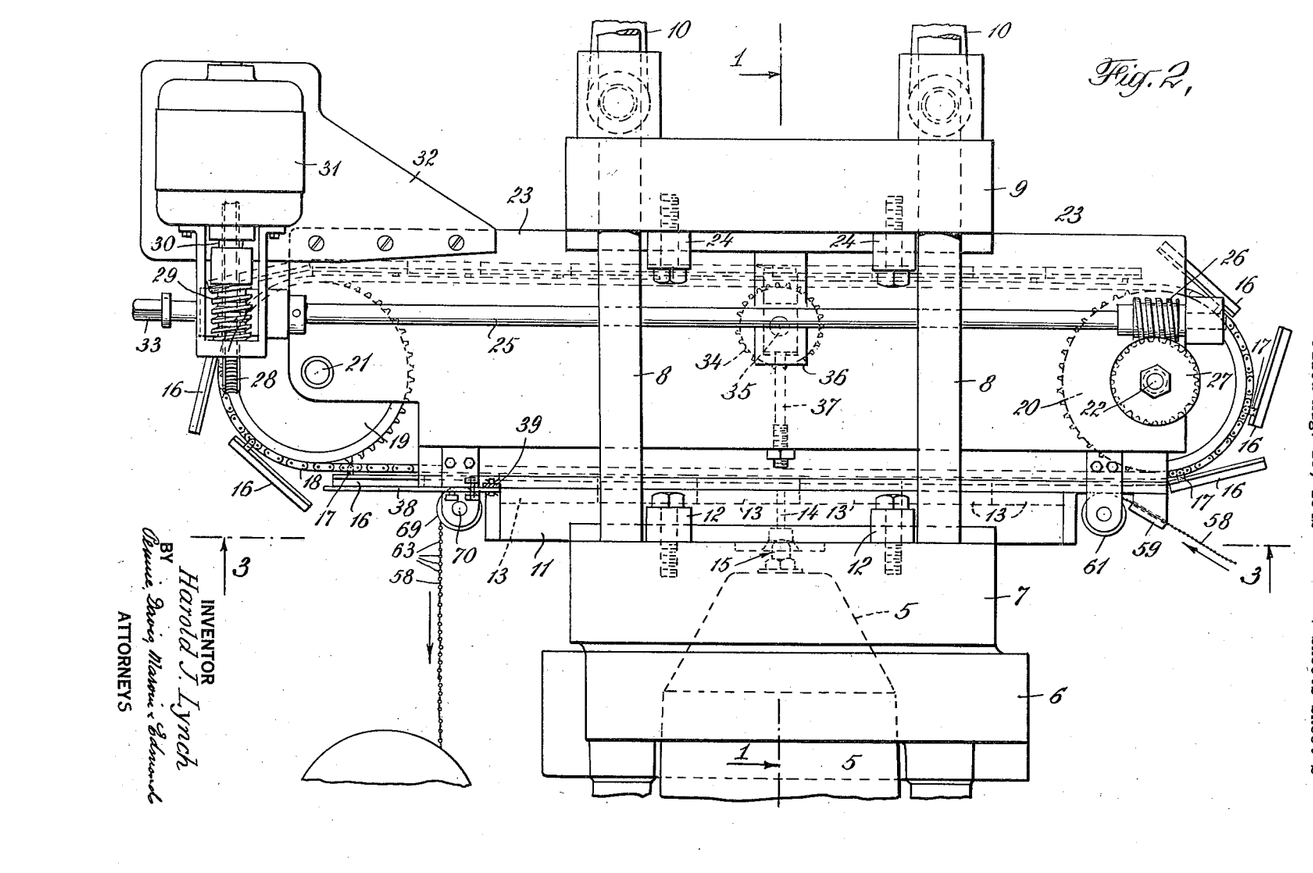
Fig. 2 is a plan view illustrating the apparatus supported in position on a typical injection molding machine.

Referring to Figs. 1 and 2 of the drawings, 5 indicates the injection head of a standard injection molding machine. It will be understood that the co-operating parts permitting the introduction and plasticizing of the molding material, which are not shown in the drawings, may include any suitable mechanism for the purpose. The machine is mounted in a rigid frame 6 carrying the stationary mold plate 7 and having guide bars 8 upon which the movable mold plate 9 is slidably supported. The movable mold plate 9 is actuated by toggle links 10 connected to mechanism (not shown) which causes the movable mold plate 9 to advance and retract under control of the operator, so that the mold may be closed and opened at intervals. The mechanism last described is well known in the art, and the details thereof require no further description or illustration.

In carrying out the present invention, a plate 11 is secured by clamps 12 to the face of the plate 7 and supports the fixed mold sections 13 which are connected by a sprue 14 to the injection nozzle 15 of the injection molding machine so that the plastic material can be injected at the proper time to the mold.

To permit molding of beads or similar bodies on continuous lengths of chain, I provide a plurality of movable mold sections 16, each connected by links 17 to chains 18. The chains 18 travel over sprockets 19 and 20 which are supported on shafts 21 and 22 in a frame 23 which is secured by clamps 24 to the movable mold plate 9. The frame 23 and the mechanism supported thereon travel with the movable mold plate 9, thus permitting the mold to be opened and closed at intervals.

It is necessary to actuate the chains to move the mold sections at intervals. A shaft 25 journalled in the frame 23 and carrying a worm 26 meshes with a worm-wheel 27 which is secured to the shaft 22. A worm-wheel 28 is secured to the shaft 25 and meshes with a worm 29 on the shaft 30 of a motor 31. The motor is mounted on a bracket 32 and when current is supplied thereto the shaft 25 is actuated to drive the chains 18. A squared head 33 on the end of the shaft 25 permits manual operation by means of a wrench in adjusting the machine. Idle-sprockets 34 are mounted on a shaft 35 which is journalled in slidable blocks 36 in the frame 23. Screws 37 permit adjustment of the blocks 36 to take up the slack of the chains 18.

Figure 3:
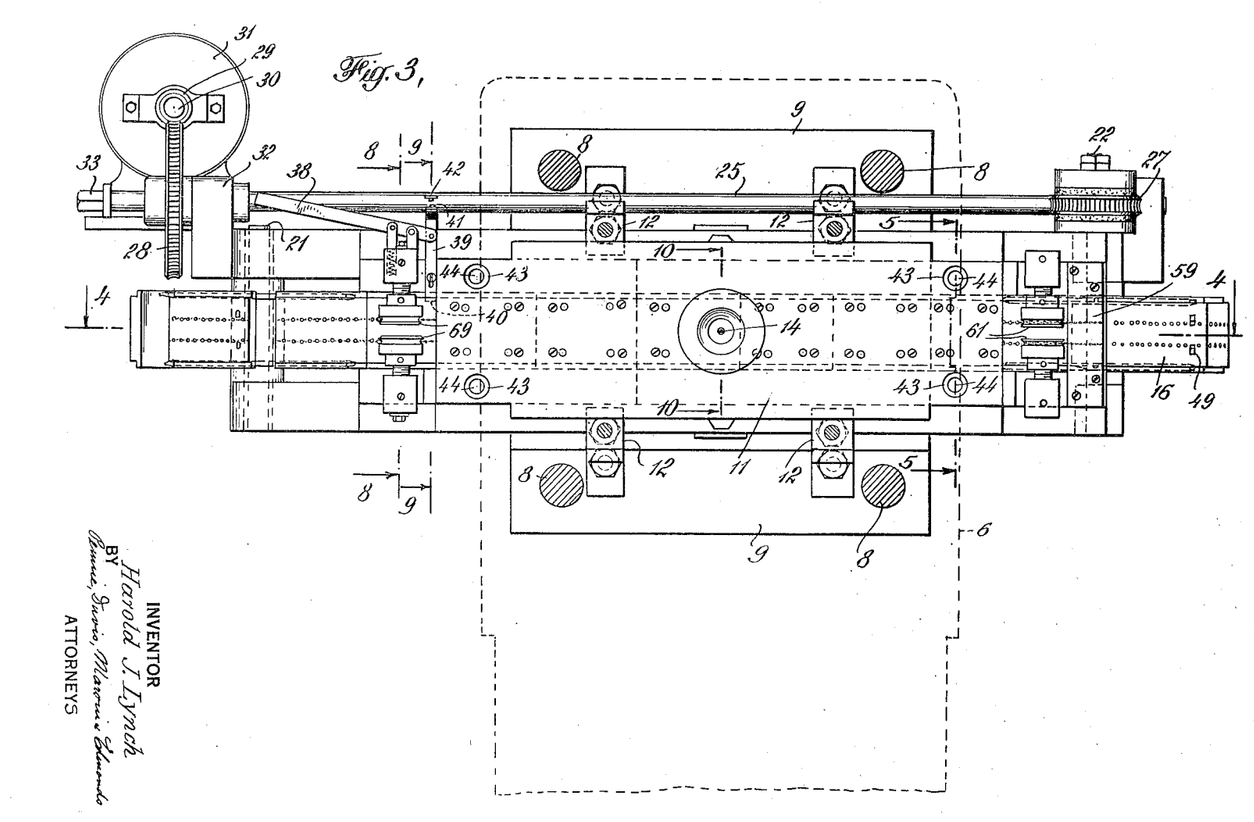
Fig. 3 is a section on the line 3—3 of Fig. 2.
Figure 9:
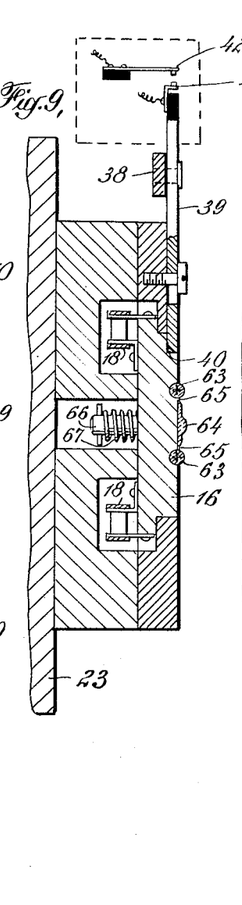
Fig. 9 is an enlarged section on the line 9—9 of Fig. 3.
Figure 11:
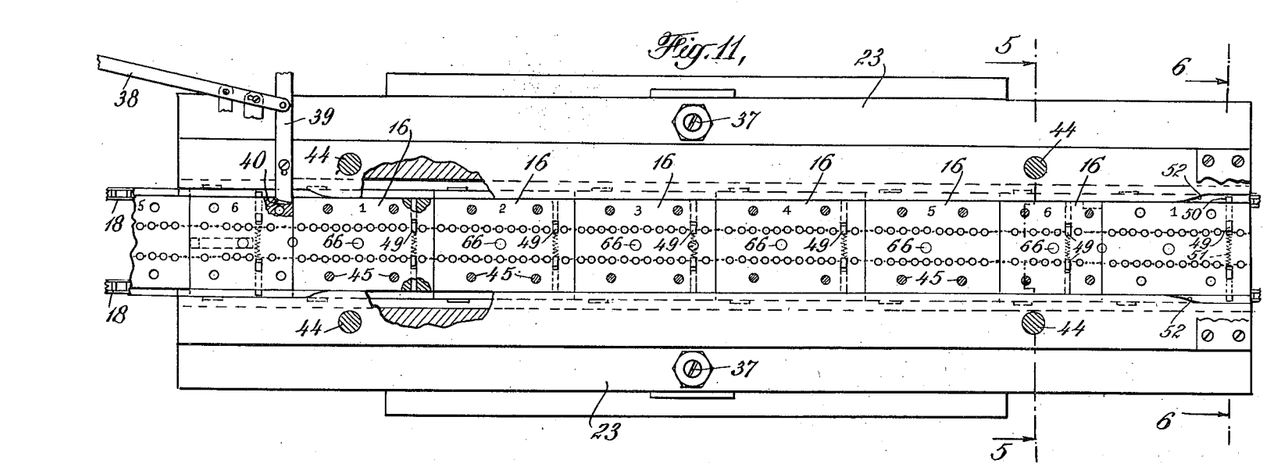
Fig. 11 is a section on the line 11—11 of Fig. 1.
Figure 12:
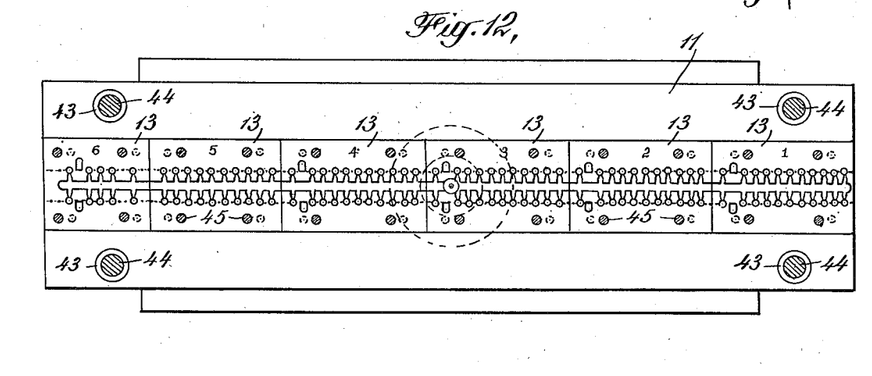
Fig. 12 is a section on the line 12—12 of Fig. 1.

In the present embodiment of the invention, six of the mold sections 16 are in molding position co-operating with similar stationary sections 13 when the molding material is injected. The remainder of the movable mold sections 16 are supported by the chains 18 in various positions. At the conclusion of the molding operation it is first necessary to retract the movable mold plate 9, thus opening the mold. At this point the operator depresses a lever 38 (Figs. 3 and 11) thus raising a latch-bar 39 which is slidably mounted on the frame 23. The end of the latch bar 39 is adapted to engage a notch 40 provided in the sixth mold section 16 and thus to limit movement of the mold sections with section No. 1 and the succeeding sections in molding position. When the latch-bar 39 is raised, a contact 41 (Fig. 9) on the end thereof is brought into engagement with a contact 42 which is electrically connected to a relay (not shown) which closes the circuit to and starts the motor 31. The details of electrical connections necessary to start the motor form no part of the invention and may be supplied by anyone skilled in the electrical art. As soon as the motor is started, the chains 18 will advance until the complete series of sections from 1 to 6 have been moved from the molding position and the sixth section is in position to permit the latch-bar 39 to engage the notch 40 therein. Thereupon the circuit is broken, the motor stops, and the machine is in position for the next molding operation. At this point the movable mold plate 9 is advanced through the mechanism provided for that purpose, and the mold is closed.

To ensure proper registry, the plate 11 is provided with sleeves 43 adapted to receive pins 44 in the opposing plate. As an additional precaution, pins 45 are shrunk in openings provided for that purpose in the plate 11 and engage similar openings 46 in the movable mold sections 16. Consequently when the mold is closed the opposed sections will be in position of perfect registry, and at the completion of the molding operation the molded bodies or other objects will be uniform and free from distortion. After the molding operation, the movable plate 9 is retracted and the sequence of operations is repeated.

In order to mold beads on a chain, it is necessary to provide molds having certain definite characteristics, and reference is made to Figs. 13 to 20 inclusive for the details of such molds. Figs. 13 and 15 to 17 represent the movable mold sections 16. Though the several segments from 1 to 6 inclusive differ in respect to the arrangement of the depressions in the surface in order that the beads may be formed at proper intervals, all of the sections have depressions 47 corresponding to half of the shape of the desired bead and also recesses 48 corresponding to half of the chain which is laid in these recesses, in the manner hereinafter described, as the mold sections advance to molding position. In addition, each of the mold sections, with the exception of section 5, is provided with a pair of fingers 49 (Fig. 6) carried by pins 50 and forced apart by a compression spring 51. These pins are adapted to be advanced by engagement with cam surfaces 52 to grip the chain at intervals. The omission of the fingers in the mold section 5 is due merely to the fact that in this particular section, owing to the arrangement of the beads, there is no room for the fingers which might otherwise be used. In molding beads in a different conformation, the fingers might similarly be omitted in any particular mold section.

Figure 13:
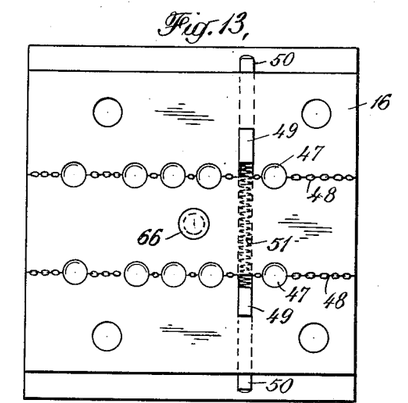
Fig. 13 is an enlarged plan view of one of the movable mold segments.
Figure 14:
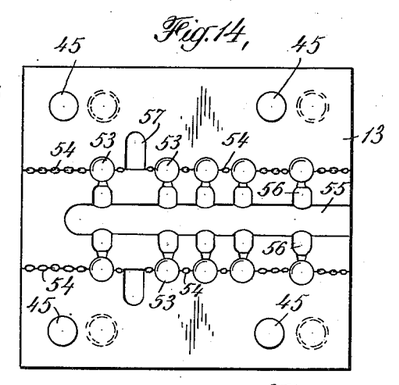
Fig. 14 is a similar view of the corresponding stationary mold segment.
Figure 15:
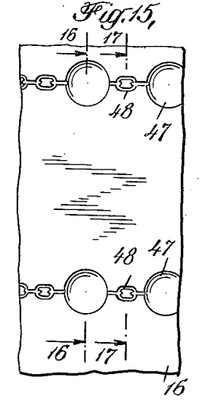
Fig. 15 is an enlarged plan view of a portion of the mold segment as shown in Fig. 13.
Figure 16:
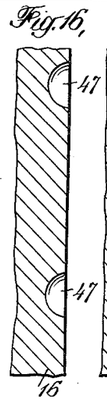
Fig. 16 is a section on the line 16—16 of Fig. 15.
Figure 17:
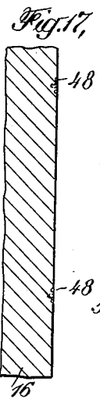
Fig. 17 is a section on the line 17—17 of Fig. 15.
Figure 18:
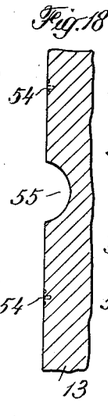
Fig. 18 is a section on the line 18—18 of Fig. 20.
Figure 19:
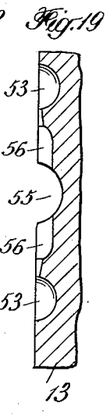
Fig. 19 is a section on the line 19—19 of Fig. 20.
Figure 20:
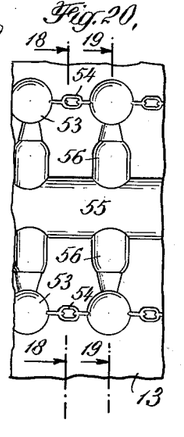
Fig. 20 is an enlarged portion of the mold segment as shown in Fig. 14.

In Figs. 14 and 18 to 20 inclusive, the details of the fixed mold sections are illustrated. In addition to depressions 53 corresponding to half of the form of the bead, and recesses 54 corresponding to half of the chain, these sections are provided with depressions affording a "run" 55 and depressions 56 forming "gates" to the depressions 53. Thus the plastic material introduced through the sprue 14 travels through the run 55 and the gates 56 to the depressions in which the beads are formed. Depressions 57 are provided to accommodate the fingers 49 (Figs. 6 and 13).

Figure 4:
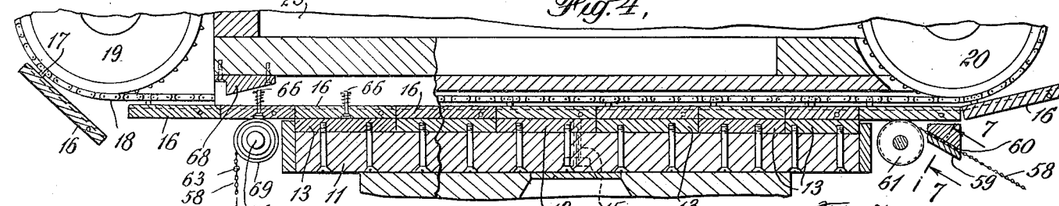
Fig. 4 is an enlarged section on the line 4—4 of Fig. 3.
Figure 5:
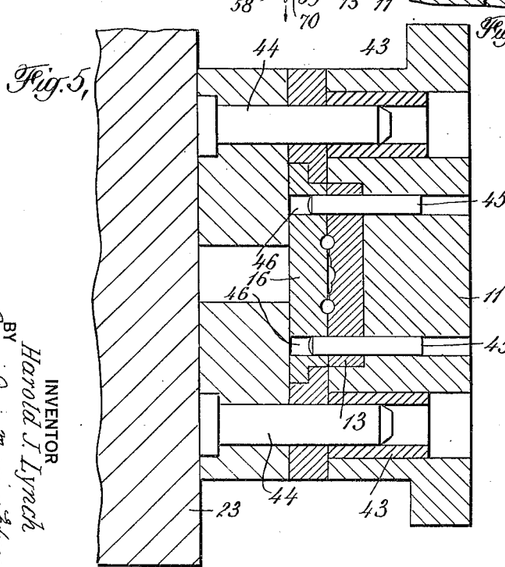
Fig. 5 is an enlarged section on the line 5—5 of Fig. 3.
Figures 6, 7:
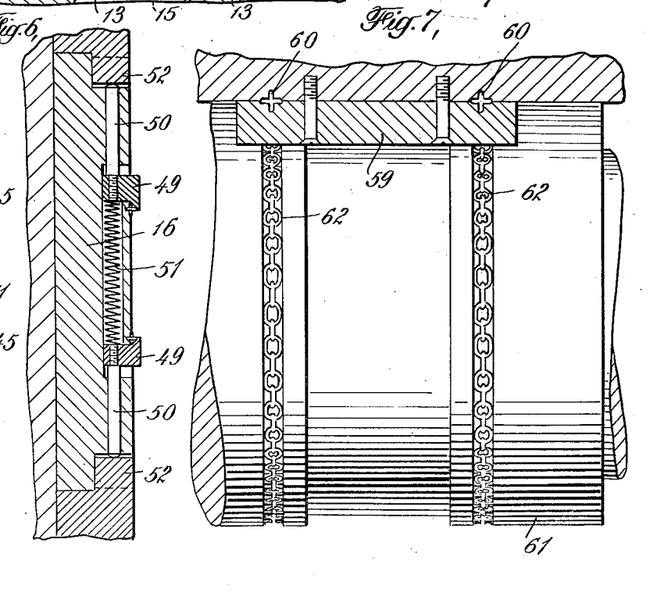
Fig. 6 is an enlarged section on the line 6—6 of Fig. 11.
Fig. 7 is an enlarged section on line 7—7 of Fig. 4.

Referring to Figs. 4 and 7, the chain is introduced to the machine as the movable mold sections are advanced, the finished chain with the beads molded thereon being removed simultaneously from the movable mold sections in which the beads were formed. In the present embodiment of the invention, two chains are introduced simultaneously and consequently the mold sections are provided with depressions 53 to form beads on both of the chains. This duplication increases the capacity of the apparatus. The chains 58 are introduced through a guide-block 59 having grooves 60 in the form of a cross so that the consecutive links of the chain are held in definite relation to each other. The chains pass over a roller 61 having recesses 62 cut in its surface to receive the chain with the links in the position determined by the grooves 60, and the chains are laid in corresponding depressions in the mold section which at the moment is temporarily above the roller 61 and advancing to molding position. Thus each of the mold sections from 1 to 6 receives a portion of each of the chains with the links in predetermined relation as the sections advance until movement of the sections is arrested by engagement of the latch-bar 39 with the notch 40 in the leading section No. 6. Simultaneously with the laying of the chain in the recesses in each section, the fingers 49 (Fig. 6) are moved by engagement of the pins with the cam surfaces 52 so as to grip the chain between two depressions 47 (Fig. 13) and thus hold the chain in proper position. As already indicated, the gripping fingers 49 are omitted in section No. 5, and they could be omitted in other sections. It is necessary merely to grip the chain at intervals so that possible movement is avoided.

Figure 8:
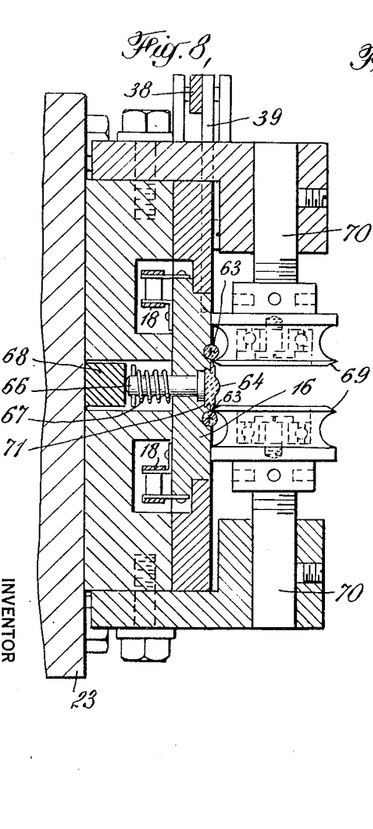
Fig. 8 is an enlarged section on the line 8—8 of Fig. 3.
Figure 10:
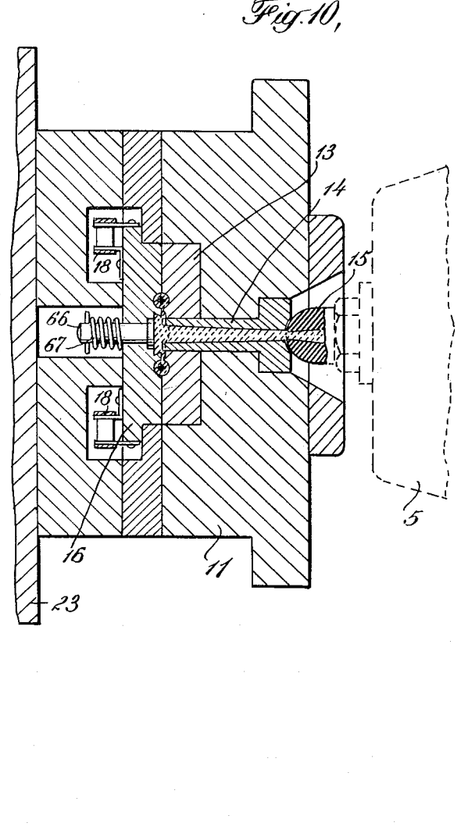
Fig. 10 is an enlarged section on the line 10—10 of Fig. 3.

As the mold sections advance to bring a new set into molding position, the sections carrying the finished chain are withdrawn. These sections (see Figs. 8 to 10 inclusive) carry the chain with the beads 63 molded thereon, together with the run 64 which is connected to the beads by the gates 65. The run 64 is engaged by a knockout member 66 which is slidably supported in each mold section and held in the position indicated in Fig. 10 by a spring 67. As the movable mold sections advance, the knockout member engages a cam surface 68 (Figs. 4 and 8) and at the same time the guides 65 pass beneath two rotatable knives 69 mounted on shafts 70 in the frame of the apparatus. The knives cut the gates from the beads while the knockout member 66 is forced upwardly causing the run to separate and drop into a suitable receptacle, while the chains carrying the beads are separately withdrawn and wound upon any suitable receiving reel (not shown). In order to ensure that the run 64 will separate from the fixed mold sections when the sections are separated, the groove 71 with undercut edges (Figs. 8 and 10) is formed directly above the knockout member 66. Thus when the mold sections are separated, the run with the chains and beads formed thereon is held on the movable sections until the knives 69 sever the beads and the knockout member forces the run from the groove in which it is held. Simultaneously the fingers 49 are released by the action of the springs 51 (Fig. 6) and the chains carrying the beads are released from the mold sections, thus completing the cycle. The molding machine is then actuated to bring the opposed mold sections together so that they are in position to receive the plastic composition, the chains having been laid in the sections in the manner hereinbefore described.

Figure 21:
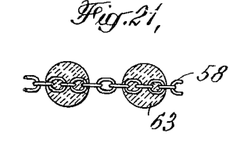
Fig. 21 is a sectional view illustrating a fragment of the finished product.
Figure 23:
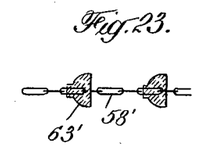
Fig. 23 illustrates another type of bead applied to a chain.

The resulting product is illustrated in Fig. 21, in which the chain 58 carries beads 63 molded upon the links of the chain with free links between. The number of links between beads can, of course, be varied, although it is necessary to provide mold sections with depressions of the proper size and in the required sequence to produce the particular arrangement of beads which may be desired. Obviously mold sections may be designed to meet any requirement with respect to the type of chain used and the size and configuration of the beads to be molded thereon. Thus in Fig. 23 the chain 58' is formed of links different in shape from those illustrated in Fig. 21, and the mold sections would be made to conform to these links. Likewise, the beads 63' are of different form, and the depressions in the mold sections would be such as to produce beads of this particular shape.

Figure 22:
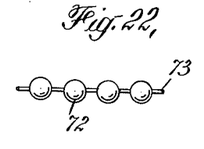
Fig. 22 is a similar view illustrating the application of the invention to the formation of beads from flexible elements other than chains.

While the apparatus is designed particularly to facilitate the molding of beads and similar bodies on chains, it may be utilized for molding beads 72 such as those illustrated in Fig. 22 on a wire or other flexible element 73. In this case, much of the detail of the mold sections can be omitted because the problem of preventing twisting of the chain is not present. The apparatus otherwise facilitates the production of beads on a flexible element which does not embody links.

While the apparatus as described is adapted for manual control, that is the operator is required to initiate each operation by means of the lever 38, and the injection molding machine is likewise manually controlled in the ordinary manner, it is evident that the mechanism could be correlated by including devices capable of actuating the lever 38 at suitable intervals with interlocking means to prevent movement of the mold sections before the mold plates are retracted and advancing of the mold plates before the cycle of movement of the mold sections is completed.

The apparatus as described affords a practical and commercially operable mechanism permitting the continuous production of chains and similar elements carrying beads and the like by injection molding. The operation is relatively rapid and requires a minimum of labor, thus materially reducing the cost of products adapted for numerous useful purposes.

Various changes may be made in the procedure and in the apparatus employed without departing from the invention or sacrificing the advantages thereof.

I claim:

1. In an apparatus for injection molding, a series of longitudinally movable mold sections each having molding depressions and angularly disposed recesses between said molding depressions shaped to receive angularly-disposed, loosely-connected links of a chain with the successive links thereof in a predetermined angular relation one to another, means for advancing the mold sections, and means for positioning the successive links of the chain in the same predetermined angular relation as said recesses in the mold sections and for laying the links successively in that relation in said recesses of the mold sections as the mold sections are advanced.

2. In an apparatus for injection molding, a series of longitudinally movable mold sections having angularly disposed recesses therein shaped to receive a chain with the successive links thereof in a predetermined angular relation, means for advancing the mold sections, means for positioning the successive links of the chain in the same predetermined angular relation as the recesses in the mold sections and for laying the links in that relation in the recesses of the mold sections as the mold sections are advanced, and means carried by the mold sections and movable relative to them for engaging and securing the chain to the mold sections as it is laid in the recesses in them.

3. In an apparatus for injection molding, a series of longitudinally movable mold sections each having molding depressions and angularly disposed recesses between said molding depressions to receive angularly-disposed, loosely-connected links of a chain with the successive links thereof in a predetermined angular relation one to another, means for advancing the mold sections and means for positioning the successive links of the chain in the same predetermined angular relation as said recesses in the mold sections and for laying the links in that relation in said recesses of the mold sections as the mold sections are advanced, including a roller having peripheral recesses constructed and arranged to receive successive links of the chain in the same predetermined angular relation as said recesses in the mold sections and to guide them into registry with the recesses in the mold sections.

4. In an apparatus for injection molding, a series of longitudinally movable mold sections having angularly disposed recesses therein to receive a chain with the successive links thereof in a predetermined angular relation, means for advancing the mold sections, and means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold the successive links of the chain in said predetermined relation.

5. In an apparatus for injection molding, a series of longitudinally movable mold sections having angularly disposed recesses therein to receive a chain with the successive links in a predetermined angular relation, means for advancing the mold sections, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections, and means carried by the mold sections and movable relative to the mold sections for engaging and securing the chain to them as it is laid in the recesses in them.

6. In an apparatus for injection molding, a series of longitudinally movable mold sections having angularly disposed recesses therein to receive a chain with successive links in a predetermined angular relation, means for advancing the mold sections, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold successive links of the chain in predetermined angular relation, and means carried by the mold sections and movable relative to the mold sections for engaging and securing the chain to them as it is laid in the recesses in them.

7. In an apparatus for injection molding, an endless conveyor, means for advancing the conveyor intermittently, a plurality of series of molded sections supported on the conveyor, each having molding depressions and angularly disposed recesses between said molding depressions shaped to receive angularly-disposed, loosely-connected links of a chain with the successive links in a predetermined angular relation one to another, and means for positioning the successive links of the chain in the same predetermined angular relation as said recesses in the mold sections and for laying the successive links in that relation in said recesses of the mold sections as the mold sections are advanced.

8. In an apparatus for injection molding, an endless conveyor, means for advancing the conveyor intermittently, a plurality of series of mold sections supported on the conveyor and having angularly disposed recesses therein shaped to receive a chain with the successive links in a predetermined angular relation, means for positioning the successive links of the chain in the same predetermined angular relation as the recesses in the mold sections as the mold sections are advanced, and means carried by the mold sections and movable relative to the mold sections for engaging and securing the chain to them as it is laid in the recesses in them.

9. In an apparatus for injection molding, an endless conveyor, means for advancing the conveyor intermittently, a plurality of series of mold sections supported on the conveyor, each having molding depressions and angularly-disposed recesses between said molding sections shaped to receive a chain with the successive links in a predetermined angular relation one to another, and means for positioning the successive links of the chain in the same predetermined angular relation as said recesses in the mold sections and for laying the successive links in that relation in said recesses of the mold sections as the mold sections are advanced, including a roller having peripheral recesses adapted to register with said recesses in the mold sections.

10. In an apparatus for injection molding, an endless conveyor, means for advancing the conveyor intermittently, a plurality of series of mold sections supported on the conveyor and having angularly disposed recesses therein to receive a chain with the successive links in a predetermined angular relation, and means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold the links of the chain in predetermined relation.

11. In an apparatus for injection molding, an endless conveyor, means for advancing the conveyor intermittently, a plurality of series of mold sections supported on the conveyor and having angularly disposed recesses therein to receive a chain with the successive links in a predetermined angular relation, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections, and means carried by the mold sections and movable relative to them for engaging and securing the chain to the mold sections as it is laid in the recesses in them.

12. In an apparatus for injection molding, an endless conveyor, means for advancing the conveyor intermittently, a plurality of series of mold sections supported on the conveyor and having angularly disposed recesses therein to receive a chain with successive links in a predetermined angular relation, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold the links of the chain in a predetermined relation, and means carried by the mold sections and movable relative to them for engaging and securing the chain to the mold sections as it is laid in the recesses in them.

13. In an apparatus for injection molding, a series of longitudinally movable mold sections each having molding depressions and angularly disposed recesses between said molding depressions shaped to receive a chain with successive links in a predetermined angular relation one to another, means for advancing the mold sections, means for positioning the successive links of the chain in the same predetermined angular relation as said recesses in the mold sections and for laying the successive links in that relation in said recesses of the mold sections as the mold sections are advanced, and means for trimming waste material from said bodies molded about the chain in the depressions in said mold sections as the mold sections are advanced.

14. In an apparatus for injection molding, a series of longitudinally movable mold sections having angularly disposed recesses therein to receive a chain with successive links in a predetermined angular relation and depressions adapted to receive molded bodies on the chain, means for advancing the mold sections, means for positioning the successive links of the chain in the same predetermined angular relation as the recesses in the mold sections and for laying the successive links in that relation in the recesses of the mold sections as the mold sections are advanced, means carried by the mold sections and movable relative to them for engaging and securing the chain to the mold sections as it is laid in the recesses in them, and means for trimming waste material from the bodies molded in the depressions in the mold sections as the mold sections are advanced.

15. In an apparatus for injection molding, a series of longitudinally movable mold sections having angularly disposed recesses therein to receive a chain with successive links in a predetermined angular relation and depressions adapted to receive molded bodies on the chain, means for advancing the mold sections, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold the links of the chain in predetermined relation, and means for trimming waste material from the bodies molded in the depressions in the mold sections as the mold sections are advanced.

16. In an apparatus for injection molding, a series of longitudinally movable mold sections having angularly disposed recesses therein to receive a chain with successive links in a predetermined angular relation and depressions adapted to receive molded bodies on the chain, means for advancing the mold sections, means for positioning the successive links of the chain in the same predetermined angular relation as the recesses in the mold sections and for laying the successive links in that relation in the recesses of the mold sections as the mold sections are advanced, including a roller having peripheral recesses adapted to register with the recesses in the mold sections and a feed guide having a grooved guideway to hold the links of the chain in predetermined relation, and means for trimming waste material from the bodies molded in the depressions in the mold sections as the mold sections are advanced.

17. In an apparatus for injection molding, an endless conveyor, means for advancing the conveyor intermittently, a plurality of series of mold sections supported on the conveyor, each of the mold sections having a plurality of molding and connecting recesses therein, means for laying a continuous flexible member in recesses of the mold sections as they are advanced, and means carried by the mold sections and movable relative to them for engaging and securing the flexible member to the mold sections as it is laid in recesses in them.

18. In an apparatus for injection molding, a series of stationary mold sections having recesses therein, a series of mold sections movable longitudinally relative to the stationary mold sections and having recesses adapted to register with the recesses in the stationary mold sections, means for advancing the longitudinally-movable mold sections, means for laying a chain in the recesses of the longitudinally-movable mold sections as they are advanced, means for arresting the movement of the longitudinally-movable mold sections when recesses therein are in registry with recesses in the stationary mold sections, and means for injecting material to be molded into the registered recesses and about the chain during intervals when the movement of the longitudinally-movable mold sections is arrested.

19. In an apparatus for injection molding, a series of stationary mold sections having molding depressions and angularly-disposed recesses therein, a series of mold sections movable longitudinally relative to the stationary mold sections and having molding depressions and angularly disposed recesses shaped to receive a chain with the successive links thereof in a predetermined angular relation and adapted to register with the angularly-disposed recesses in the stationary mold sections, means for advancing the longitudinally-movable mold sections, means for positioning the successive links of a chain in the same predetermined angular relation as the recesses in the longitudinally-movable mold sections and for laying the links in that relation in the recesses of said mold sections as they are advanced, means for arresting the movement of the longitudinally-movable mold sections when molding depressions therein are in registry with molding depressions in the stationary mold sections, and means for injecting material to be molded into the registered depressions and about the chain during intervals when the movement of the longitudinally-movable mold sections is arrested.

HAROLD J. LYNCH.